United States Patent Office 3,720,517
Patented Mar. 13, 1973

3,720,517
PREPARATION OF A FERMENTED MALT
CHAMPAGNE
Vincent S. Bavisotto, Mahtomedi, and Jerome S. Haggenmiller, St. Paul, Minn., assignors to Theodore Hamm Brewing Co.
No Drawing. Filed Dec. 21, 1970, Ser. No. 100,521
Int. Cl. C12g 1/06
U.S. Cl. 99—35                                     5 Claims

ABSTRACT OF THE DISCLOSURE

A naturally brewed beverage having a champagne taste prepared by adding a sugar and cold water dispersible edible organic acid to a yeast fermented boiled aqueous medium containing a fermentable carbohydrate, a food grade material having a high soluble protein or amino acid content, malt and hops or hops extract.

SUMMARY OF THE INVENTION

In accordance with the instant invention, a naturally brewed malt champagne is prepared by adding a sugar selected from the group consisting of invert sugar, dextrose, sucrose and mixtures thereof and a cold water dispersible acid selected from the group consisting of citric acid, fumaric acid and mixtures thereof to fermented carbonated alcoholic malt base. In this manner a beverage is prepared having the consistency, mouth-feel and taste of champagne. Hence the process of this invention provides a means for providing a champagne beverage without the use of grapes and without the addition of flavors.

DETAILED DESCRIPTION

The fermented carbonated alcoholic malt base is prepared by carbonating a yeast fermented boiled aqueous medium containing a fermentable carbohydrate from one or more sources; a food grade material having a high soluble protein or amino acid content; malt and hops or hop extract. To this fermented aqueous carbonated base is added a cold water dispersible acid selected from the group consisting of fumaric acid, citric acid and mixtures thereof and a sugar selected from the group consisting of dextrose, fructose, sucrose, invert sugar and mixtures thereof.

In preparing the beverage of this invention, from about 0.1 to 2 gallons of the sugar per 31 gallons of the carbonated yeast fermented alcoholic malt base is used. Generally it is preferred to utilize from about 0.1 to 0.5 gallon of the sugar per 31 gallons of the alcoholic malt base for a dry-type champagne. If a sweet champagne is desired, it is preferable to utilize 1 to 2 gallons of the sugar per 31 gallons of the alcoholic base.

In preparing the alcoholic champagne flavored beverage of this invention, the acid is added in an amount of from 0.4 to 1.2 pounds per 31 gallons of the fermented, alcoholic, malt base. The preferred acid for use in this invention is citric acid.

The product of this invention has a good, clear champagne character with a slight autolyzed yeast flavor which is typical of well aged high grade champagnes. By contrast, bulk champagnes produced with a short aging cycle do not have this desirable taste character. In the process of this invention, a beverage having the same champagne flavor, mouth-feel, etc. as well aged natural champagne is produced in a period of at most twenty-one days. The carbonated alcoholic base is prepared by adding a high protein containing edible food grade material, malt and a fermentable carbohydrate to water, boiling the thus obtained mixture with or without added hops or hop extract, cooling said mixture, adding yeast to the cooled boiled mixture, allowing the cooled mixture to ferment to completion, cooling the fermented mixture, separating the solids from the fermented mixture, and carbonating the resulting liquid mixture.

In preparing the alcoholic malt base of this invention, any food grade material having a high soluble protein or amino acid content can be utilized as a source of nitrogen and yeast stimulant.. Generally, these food grade materials should have a soluble protein or amino acid content of at least 35% by weight, preferably from about 40% by weight to 50% by weight, based upon the weight of the food grade material. A preferred food grade material in accordance with this invention are materials derived from soya bean, such as soya flakes. The food grade material having a high protein or amino acid content utilized in accordance with this invention is added to an aqueous medium in an amount of from about 0.05% to about 0.2% by weight, based upon the weight of the total fermentation medium.

The aqueous fermentation medium in accordance with this invention should contain a fermentable carbohydrate from one or more sources. Any commercially available fermentable carbohydrate source such as a mixture of sugar such as glucose, sucrose, converted corn syrup, etc. can be utilized. In accordance with this invention, the fermentable carbohydrate is present in an amount of from about 2% by weight to about 20% by weight, based upon the weight of the aqueous fermentation medium.

The fermentation medium is produced in accordance with this invention by adding the food grade material of high soluble protein or amino acids, the fermentable carbohydrate, the hops or hop extract and the malt to an aqueous medium. The water in the fermentable aqueous medium can, in accordance with this invention, vary from about 75% by weight to 95% by weight. Furthermore, from about 1% by weight to about 25% by weight, based upon the weight of the fermentable materials, of malt or equivalent malt extract can be added to the fermentation medium. Generally the fermentation medium contains from about 0.1% to about 0.3% by weight of hops or equivalent hop extract, based upon the weight of the fermentable materials.

Prior to the addition of the yeast, the aqueous fermentation medium should be boiled. In this manner, a sterile aqueous fermentation medium is supplied which when fermented with yeast will provide a neutral tasting fermented beverage.

The fermentation medium can also contain, if desired, various inorganic ammonium, alkali metal and alkaline earth metal salts such as calcium sulfate, potassium chloride and ammonium phosphate. These salts are water corrective salts which have an important effect in controlling the pH, stability and flavor of the finished product. Different formulations of salts can be utilized, depending upon the hardness and acidity of the water being utilized. However, in certain cases, depending upon the water being utilized, no water corrective salts need be utilized. If desired, these salts are added to the fermentation medium in an amount of from about 0.04% to about 0.06% by weight, based upon the weight of the fermentation medium.

After the fermentation medium has been boiled and cooled, yeast is added to the fermentation medium to cause the fermentation medium to ferment. Any conventional yeast utilized in making beers, such as brewer's yeast (Saccharomyces cerevisiae and Saccharomyces carlsbergensis) can be utilized. Fermentation can be carried out in the conventional manner by allowing the fermentation medium containing the yeast to stand at a temperature of 45° F. to about 70° F. for a period of from three to 14 days. Generally it is preferred to utilize a fermentation temperature of from about 50° F. to 65° F.

After the fermentation is completed, the fermented aqueous medium is filtered to remove solids. Prior to filtration an agglomerating agent can be added to the fermentation medium in order to expedite the settling of the yeast and suspended solids so as to cause both the yeast and the suspended solids to precipitate out in a relatively short period of time. Any conventional agglomerating agent can be added to the fermented aqueous medium. Among the conventional agglomerating agents are included gelatin, fish collagen, etc.

Prior to filtration, the fermented aqueous medium can be cooled to a temperature of from 30° F. to about 50° F. This aids in the precipitation of the solids and yeast from the fermented liquid.

The liquid obtained upon filtration is a brilliantly clear neutral fermented liquid. This liquid is then purged and carbonated by conventional methods to introduce 2.5 to 4.0 volumes of $CO_2$ per volume of the liquid. Generally it is preferred to carbonate so as to introduce 2.9 to 3.3 volumes of $CO_2$ per volume of the liquid.

The carbonation can take place before or after sugar and acid are added to the fermented alcoholic base.

The invention is further illustrated by the following examples.

Example 1

31 gallons (1 barrel) of champagne flavored beverage was prepared utilizing the following ingredients:

| Ingredient: | | Amount |
|---|---|---|
| Malt extract | pounds | [1]12.5 |
| Dextrose (Cerelose) | do | 45.0 |
| Hop extract (34% alpha acids) | do | [2]0.009375 |
| Soya flakes | do | 0.235 |
| Calcium sulfate | do | 0.0769 |
| Enzyme (amylolytic and proteolytic) | do | 0.010 |
| Refined fish collagen (Magicol 250) | do | 0.0035 |
| Invert sugar (77° Brix) | gallons | 0.2621 |
| Critic acid, anhydrous | pounds | 0.8165 |
| Brewer's pitching yeast | do | 6.26 |
| Water | do | 202 |

[1] Equivalent to 15.25 pounds malt.
[2] Equivalent to 0.075 pound hops.

The naturally brewed malt champagne of this invention was prepared in the following manner:

To 202 pounds of boiling, acidified water (approximately pH 5.8) in a brew kettle, there was added 0.0769 pound of calcium sulfate and 0.2350 pound of soya flakes. To this mixture there was added 12.5 pounds of malt extract (equivalent to 15.25 pounds of malt), 45.0 pounds of dextrose (Cerelose) and 0.009375 pound of hop extract (34% alpha acids). The boiling was continued for approximately 30 minutes. After this period the mixture was transferred to a hot wort tank (or if desired a swirl tank) for separation of the hot trub. The wort was then transferred to a wort cooler and cooled to approximately 10° C.–16° C. After cooling the mixture was aerated and pitched with approximately 3 to 9 pounds of brewer's yeast (*Saccharomyces cerevisiae* or *Saccharomyces carlsbergensis*). To the mixture there was injected approximately 0.005 to 0.15 pound of an amylolytic and proteolytic enzyme.

Wort was then transferred to a fermentor and allowed to ferment at approximately 12° C. to 20° C. for approximately three days until correct apparent extract was obtained (approximately −1.0% or lower).

After fermentation the product was then cooled to approximately 0° to 5° C. and then transferred under carbon dioxide counterpressure to a storage tank. Low temperature was maintained and air pick-up was avoided during this transfer. During the preceding transfer of the fermented wort from the fermentor to the storage tank an aqueous solution containing approximately 2 pounds of refined fish collagen (Magicol 250) was added. This collagen was added as a clarifying agent to achieve a rapid settling of the yeast and other suspended solids. After settling for a period of approximately five days, the product was filtered through a diatomaceous earth filter. On the discharge side of the filter, approximately 0.5 gallon of invert sugar (77° Brix) and approximately 1.2 pounds of anhydrous citric acid were added to achieve a champagne-like character. The product was then transferred under a carbon dioxide counterpressure to a finishing tank where the product was finally carbonated to approximately 3.0 volumes of carbon dioxide and bottled.

Example 2

31 gallons of a naturally brewed malt champagne was prepared in the same manner as Example 1 except that fermentation was carried out for ten days and 0.1 gallon of invert sugar was utilized.

Example 3

31 gallons of a naturally brewed malt champagne was prepared in the same manner as Example 1 except that 0.1 gallon of invert syrup and 0.4 pound of anhydrous citric acid were utilized.

Example 4

31 gallons of a sweet champagne was prepared in the manner of Example 1 except that 2.0 gallons of invert sugar was utilized.

What is claimed is:

1. A method of making a naturally brewed malt champagne comprising the steps of fermenting by means of brewer's yeast a boiled aqueous medium containing from about 0.05% to about 0.2% by weight of soya flakes, from about 1% to about 25% by weight of malt, from about 0.1% by weight to about 0.3% by weight of hops or equivalent hop extract, and from about 2% to about 20% by weight of a fermentable carbohydrate to produce an alcoholic base, filtering said alcoholic base, adding to said base from 0.1 to 2 gallons per 31 gallons of said base of a sugar selected from the group consisting of dextrose, fructose, sucrose, invert sugar and mixtures thereof, adding to said base, from about 0.4 to 1.2 pounds per 31 gallons of said base, an acid selected from the group consisting of fumaric acid, citric acid and mixtures thereof, and carbonating said base to a carbon dioxide content of from 2.5 to 4 volumes of carbon dioxide per volume of the liquid.

2. The process of claim 1 wherein said acid is citric acid.

3. The process of claim 2 wherein said sugar is present in an amount of from 0.1 to 0.5 gallon per 31 gallons of said base.

4. The process of claim 1 wherein said base is carbonated by the addition of from about 2.9 to 3.3 volumes of carbon dioxide per volume of said base.

5. The product of the process as defined in claim 1.

References Cited

UNITED STATES PATENTS

| 3,066,025 | 11/1962 | Simkin | 99—35 |
| 576,510 | 2/1897 | Sauer | 99—35 X |
| 612,746 | 10/1898 | Munsche | 99—38 |
| 2,692,199 | 10/1954 | Weber | 99—42 |

FOREIGN PATENTS

| 9,363 | 1887 | Great Britain. |

OTHER REFERENCES

Amerine et al., The Technology of Wine Making. The Avi Publishing Co., Inc., Westport, Conn., 2nd ed., 1967 (pp. 310–313, 456–465, 482–485) TP548A48.

A. LOUIS MONACELL, Primary Examiner

D. M. NAFF, Assistant Examiner

U.S. Cl. X.R.

99—30, 31, 49